United States Patent [19]

Lange

[11] 3,953,221
[45] Apr. 27, 1976

[54] FULLY DENSE CERAMIC ARTICLE AND PROCESS EMPLOYING MAGNESIUM OXIDE AS A SINTERING AID

[75] Inventor: Frederick F. Lange, Murrysville, Pa.

[73] Assignee: The United States of America as represented by the Secretary of the Navy, Washington, D.C.

[22] Filed: Apr. 22, 1975

[21] Appl. No.: 570,543

[52] U.S. Cl. .................................. 106/62; 106/65; 106/73.4; 106/73.5
[51] Int. Cl.$^2$ ...................................... C04B 35/58
[58] Field of Search ............... 106/55, 62, 65, 73.4, 106/73.5

[56] References Cited
UNITED STATES PATENTS

| | | | |
|---|---|---|---|
| 3,262,761 | 7/1966 | Bechtold | 106/65 |
| 3,821,005 | 6/1974 | Layden | 106/55 |
| 3,837,871 | 9/1974 | Weaver | 106/65 |
| 3,839,540 | 10/1974 | Arrol | 106/55 |

*Primary Examiner*—J. Poer
*Attorney, Agent, or Firm*—R. S. Sciascia; J. A. Cooke; P. J. Hagan

[57] ABSTRACT

Fully dense ceramic articles are prepared by mixing powders of silicon nitride, aluminum oxide and magnesium oxide to form a composite powder composition wherein the magnesium oxide acts as a sintering aid, forming the composite powder into a desired shape, and heating the shaped composite powder composition in the absence of applied pressure at a temperature sufficient to effect sintering of the composition.

4 Claims, 1 Drawing Figure

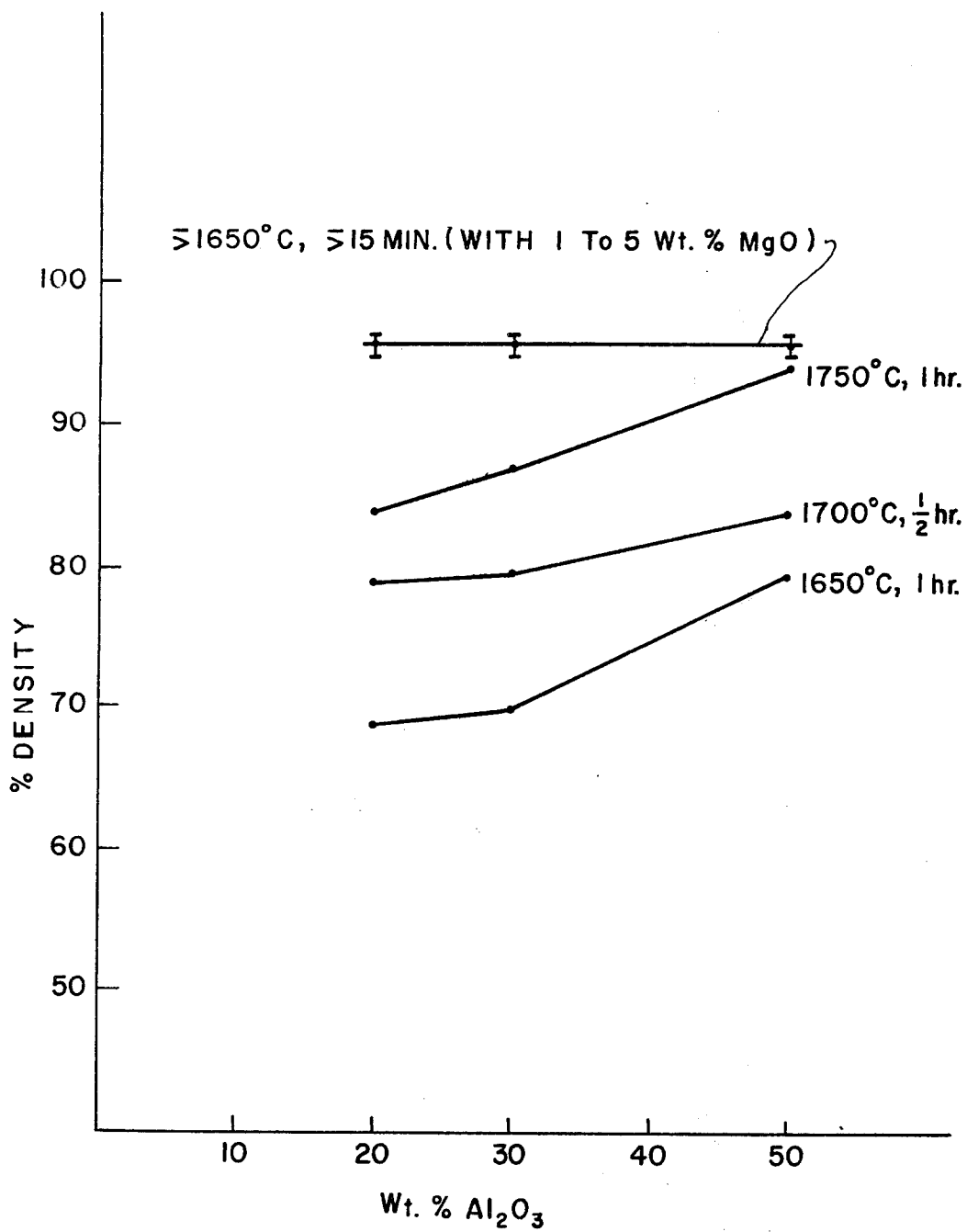

FULLY DENSE CERAMIC ARTICLE AND PROCESS EMPLOYING MAGNESIUM OXIDE AS A SINTERING AID

BACKGROUND OF THE INVENTION

The present invention relates generally to the field of ceramics and particularly to the use of magnesium oxide as a sintering aid in the preparation of fully dense ceramic articles by the powder metallurgy processing of silicon nitride and aluminum oxide compositions.

The high density ceramic articles of the present invention have utility as structural materials having good thermal shock resistance which are suitable for use where exceptional strength is not a critical requirement of the material.

Hot pressed silicon nitride ($Si_3N_4$) has been the subject of considerable investigation by a number of researchers because of its utility as a high temperature structural material. These investigations have encountered certain problems in the fabrication of $Si_3N_4$ articles, one of which is the difficulty of hot pressing the material to high density without the use of a sintering aid. For example, see British Pat. No. 1,092,637 and U.S. Pat. No. 3,821,005.

Recently, Jack and Wilson, in Nature Physical Science, Vol. 238, pp. 28 and 29, July 10, 1972, have reported that ceramics based on $Si_3N_4$ - $Al_2O_3$ (Si-Al-O-N) solid solution compositions hold great promise because the compositions result in a material with a thermal expansion lower than that of hot-pressed $Si_3N_4$. Jack and Wilson have reported further that the Si-Al-O-N system can be sintered to maximum density by conventional ceramic techniques, e.g. slip-casting, extrusion or pressing to produce pre-fired shapes which are heated to their sintering temperature without the application of pressure during the heating stage. These conventional sintering techniques are to be distinguished from the process known as "hot-pressing" which involves the application of extreme pressure during the sintering operation.

A process involving the hot-press sintering of $Si_3N_4$ -$Al_2O_3$ compositions is described in German Offen.2,262,785. Other refractory ceramic articles composed of $Si_3N_4$ and metal oxides, particularly aluminum oxide, have been prepared according to the processes disclosed in Japanese Pat. No. 9,476 (1969) and Japanese Kokai 79,216 (1973). However, none of the aforementioned prior art processes discloses the novel features of the instant invention.

In an attempt to fabricate fully dense ceramic articles having low thermal expansion by conventional processing techniques, as reported by Jack and Wilson, it was discovered that the density and the thermal expansion of the articles produced from the Si-Al-O-N compositions were inferior to the density and thermal expansion of hot-pressed $Si_3N_4$.

Thus the problem of fabricating a fully dense ceramic article which has good thermal shock resistance from a $Si_3N_4$ - $Al_2O_3$ composite powder composition by heating the composition to its sintering temperature without the need for exerting pressure on the composition during the sintering operation remains unsolved when prior art processing methods are employed.

SUMMARY OF THE INVENTION

Accordingly, an object of the present invention is to provide an improved process for producing a fully dense ceramic article from a $Si_3N_4$ - $Al_2O_3$ composite powder composition.

Another object of the present invention is to provide an economical process for producing a fully dense ceramic article from a $Si_3N_4$ - $Al_2O_3$ composite powder composition which avoids the application of extreme pressure to the composition during the sintering operation.

It is a further object of the present invention to provide a process for producing a fully dense ceramic article having good thermal shock resistance from a $Si_3N_4$ - $Al_2O_3$ composite powder composition.

A still further object of the present invention is to provide an economical process for producing a fully dense ceramic article from a $Si_3N_4$ - $Al_2O_3$ composite powder composition which facilitates the fabrication of articles having complex shapes.

Yet another object of the present invention is to provide a process for producing a fully dense ceramic article from a $Si_3N_4$ - $Al_2O_3$ composite powder composition in very short sintering periods over a wide range of sintering temperatures.

It is also an object of this invention to provide a fully dense ceramic article having good thermal shock resistance from a $Si_3N_4$ - $Al_2O_3$ - MgO composite powder composition.

These objects are accomplished by a process which comprises mixing $Si_3N_4$, $Al_2O_3$ and MgO powders to form a composite powder composition wherein the composition comprises about 50 to about 80 weight percent of $Si_3N_4$, about 15 to about 50 weight percent of $Al_2O_3$, and about 0.25 to about 5 weight percent of MgO based on the total weight of the composition, forming the composite powder composition into a desired shape, and heating the shaped composite powder composition in a non-oxidizing atmosphere under ambient pressure at a sintering temperature from about 1400°C to about 1750°C to obtain a fully dense ceramic article having good thermal shock resistance.

BRIEF DESCRIPTION OF THE DRAWING

The sole FIGURE of the drawing is a graphic representation of density determination experiments in which composite powder compositions of $Si_3N_4$ and $Al_2O_3$, with and without the addition of MgO, were tested. As shown on the graph, the X-axis represents the percentage of $Al_2O_3$ in the pre-fired composition, and the Y axis represents the relative percent density of the sintered product.

DESCRIPTION OF THE PREFERRED EMBODIMENTS

In accordance with the present invention a fully dense ceramic article having good thermal shock resistance, i.e., low thermal expansion coefficient, is prepared by mixing $Si_3N_4$, $Al_2O_3$ and MgO, as a sintering aid, to form a composite powder composition, wherein the composition comprises about 50 to about 80 weight percent of $Si_3N_4$, about 15 to about 50 weight percent of $Al_2O_3$ and about 0.25 to about 5 weight percent of MgO based on the total weight of the composition, forming the composite powder composition into a desired shape, and heating the shaped composite powder composition in a non-oxidizing atmosphere under ambient pressure at a sintering temperature from about 1400°C to about 1750°C.

The composite powder compositions are prepared by mixing the $Si_3N_4$, $Al_2O_3$ and MgO powders in a ball mill in the presence of an alcohol. After drying, the composite powder may be formed into any desired shape by slip-casting, extrusion, or pressing, for example. The shaped composite powder composition thus formed is then heated in a non-oxidizing atmosphere under ambient pressure at a sintering temperature from about 1400°C to about 1750°C. The preferred temperature range for the heating step is from about 1650°C to about 1750°C. A suitable method for shaping the composite powder composition is cold-pressing the composition in a metal die. An non-oxidizing atmosphere, which may be provided by nitrogen gas, for example, is utilized during the heating stage primarily to prevent deleterious oxidation of the composite powder composition. The use of the term "ambient pressure" is intended to signify that the only pressure acting on the composite powder composition during sintering is atmospheric pressure. In other words, no external pressure is applied to the composite powder composition during the heating stage. Thus, the instant sintering process is to be distinguished from other powder metallurgy processing in which hot-pressing is involved.

The avoidance of any hot-pressing operation in the instant process represents a distinct economic advantage, and makes the process particularly attractive when the fabrication of complex shapes is necessary. Thus, the composite powder compositions of the instant process can be pressed or slip cast to form "green ware" of various shapes which may be sintered to full densification in the absence of applied pressure. Another distinct advantage of the instant process is that high densities are obtainable in very short sintering periods over a wide range of temperatures.

EXAMPLE I 49.5 weight percent of $\alpha$-$Si_3N_4$ (average particle size ~ 0.4 $\mu$m), 49.5 weight percent of $Al_2O_3$ (average particle size ~ 0.5 $\mu$m) and 1 weight percent of MgO (average particle size ~ 5 $\mu$m) were mixed together by ball milling for 16 hours in a plastic bottle containing tungsten carbide mill balls and methanol. After drying, the composite powder was cold pressed into a two inch diameter disc and sintered at 1650°C for one hour. The sintered disc was cut into specimens and tested for flexural strength at room temperature. The room temperature flexural strength was 30,400 psi. The density of the sintered product was 3.03 gm/cc. The density of a hot-pressed sample of the same composition was 3.17 gm/cc.

In order to determine the effect of MgO on the density of ceramic articles resulting from the sintering of $Si_3N_4$ - $Al_2O_3$ composite powder compositions seven different powders were prepared with the formulations listed in Table I:

TABLE I

| Formulation No. | Weight % $Al_2O_3$ | Weight % $Si_3N_4$ | Weight % MgO |
|---|---|---|---|
| 1 | 20 | 80 | — |
| 2 | 30 | 70 | — |
| 3 | 50 | 50 | — |
| 4 | 19 | 76 | 5 |
| 5 | 28.5 | 66.5 | 5 |
| 6 | 47.5 | 47.5 | 5 |
| 7 | 49.5 | 49.5 | 1 |

These composite powders were cold-pressed into small cylinders and heated to temperatures between 1650° and 1750°C for periods from 15 to 60 minutes.

The drawing graphically illustrates that the compositions containing MgO as a sintering aid resulted in full densification of the composite powders for all of the sintering temperatures and periods tested whereas only the 50/50 weight percent composition of $Si_3N_4$ - $Al_2O_3$ without the addition of a sintering aid could be sintered to full density after one hour at 1750°C. This latter result could not be reproduced when a larger test body was utilized. The drawing clearly shows that ceramic articles of superior density are obtainable when 1 to 5 weight percent of MgO is added to a $Si_3N_4$ - $Al_2O_3$ composite powder composition prior to sintering.

The relative densities of each composition shown in the drawing are based on the density of hot-pressed samples of the same composition which have a value of 3.17 gm/cc which value is considered to represent a density of 100 percent.

The experimental values of the densities of $Si_3N_4$ - $Al_2O_3$ articles obtained in a pressureless sintering operation without the addition of MgO are listed in Table II.

TABLE II

DENSITIES OF SINTERED $Si_3N_4$ — $Al_2O_3$ COMPOSITIONS

| Temp. (°C) | Time (min.) | 80 $Si_3N_4$ 20 $Al_2O_3$ | 70 $Si_3N_4$ 30 $Al_2O_3$ | 50 $Si_3N_4$ 50 $Al_2O_3$ |
|---|---|---|---|---|
| | | Density (gm/cc) | | |
| 1650 | 15 | 2.08 | 2.14 | 2.35 |
| | 30 | 2.11 | 2.19 | 2.44 |
| | 60 | 2.16 | 2.24 | 2.52 |
| 1700 | 15 | 2.16 | 2.19 | 2.50 |
| | 30 | 2.50 | 2.52 | 2.70 |
| 1750 | 15 | 2.50 | 2.54 | 2.57 |
| | 30 | 2.52 | 2.67 | 2.80 |
| | 60 | 2.69 | 2.76 | 3.02 |

The experimental values of the densities of $Si_3N_4$ - $Al_2O_3$ - MgO articles obtained in a pressureless sintering operation are listed in Table III.

TABLE III

DENSITIES OF SINTERED $Si_3N_4$ — $Al_2O_3$ — MgO COMPOSITIONS

| Temp. (°C) | Time (min.) | 76 $Si_3N_4$ 19 $Al_2O_3$ 5 MgO | 66.5 $Si_3N_4$ 28.5 $Al_2O_3$ 5 MgO | 49.5 $Si_3N_4$ 47.5 $Al_2O_3$ 5 MgO | 49.5 $Si_3N_4$ 49.5 $Al_2O_3$ 1 MgO |
|---|---|---|---|---|---|
| | | Density (gm/cc) | | | |
| 1650 | 15 | 2.93 | 3.01 | 3.01 | — |
| | 30 | 3.02 | 3.03 | 3.03 | 3.05 |
| | 60 | 3.04 | 3.04 | 3.03 | 3.03 |
| 1700 | 15 | 3.02 | 3.02 | 3.01 | 3.03 |
| | 30 | 3.04 | 3.04 | 3.01 | 3.02 |
| 1750 | 15 | 3.06 | 3.05 | 2.72 | 3.04 |
| | 30 | 3.04 | 3.01 | 2.55 | 3.04 |

TABLE III-continued

DENSITIES OF SINTERED
$Si_3N_4$ — $Al_2O_3$ — MgO COMPOSITIONS

| | | COMPOSITION (wt. %) | | | |
|---|---|---|---|---|---|
| Temp. (°C) | Time (min.) | 76 $Si_3N_4$ 19 $Al_2O_3$ 5 MgO | 66.5 $Si_3N_4$ 28.5 $Al_2O_3$ 5 MgO | 49.5 $Si_3N_4$ 47.5 $Al_2O_3$ 5 MgO | 49.5 $Si_3N_4$ 49.5 $Al_2O_3$ 1 MgO |
| | | | Density (gm/cc) | | |
| | 60 | 3.06 | 3.04 | 2.52 | 3.03 |

Although X-ray diffraction studies of the sintered articles were made it is still uncertain whether the magnesium and oxygen atoms provided by the magnesium oxide occupy positions in the crystal lattice of the $Si_3N_4$ - $Al_2O_3$ solid solution, or whether the magnesium oxide enters into a complex bonding phase which is formed as a boundary layer on the Si-Al-O-N system during the sintering operation.

While the precise crystal lattice structure of the ceramic articles produced according to the instant invention has not been determined it has been found that these articles are similar to reaction sintered $Si_3N_4$ both in strength and in thermal shock resistance. Reaction sintered $Si_3N_4$ is a commercially available structural material which results from the sintering of silicon nitride which is formed in situ by subjecting silicon to the action of a nitriding agent. The articles produced in accordance with the teachings provided herein may be used in many of the applications in which reaction sintered $Si_3N_4$ is presently used, e.g. as a refractory structural material.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A process for producing a fully dense ceramic article which comprises the steps of
   a. mixing $Si_3N_4$, $Al_2O_3$ and MgO powders to form a composite powder composition wherein the composition comprises about 50 to about 80 weight percent of $Si_3N_4$, about 15 to about 50 weight percent of $Al_2O_3$, and about 0.25 to about 5 weight percent of MgO based on the total weight of the composition;
   b. forming the composite powder composition into a desired shape; and
   c. heating the shaped composite powder composition in an non-oxidizing atmosphere under ambient pressure at a sintering temperature from about 1400°C to about 1750°C.

2. The process of claim 1 wherein the composite powder composition is heated from about 1650°C to about 1750°C.

3. The product of the process of claim 1.

4. In a process for producing a dense ceramic article by mixing powders of $Si_3N_4$ and $Al_2O_3$, forming the mixture into a desired shape, and heating the shaped mixture in a non-oxidizing atmosphere under ambient pressure at a temperature sufficient to effect the sintering thereof, the improvement which comprises adding to the $Si_3N_4$ - $Al_2O_3$ powder mixture about 0.25 to about 5 weight percent of MgO, based on the total weight of the mixture, as a sintering aid.

* * * * *